(12) United States Patent
Willeke

(10) Patent No.: US 10,788,187 B2
(45) Date of Patent: Sep. 29, 2020

(54) ARRANGEMENT OF A HEADLIGHT IN A VEHICLE HAVING DAMAGE PROTECTION FOR THE EVENT OF A CRASH

(71) Applicant: HELLA GmbH & Co. KGaA, Lippstadt (DE)

(72) Inventor: Franz-Georg Willeke, Anroechte (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 185 days.

(21) Appl. No.: 15/996,566

(22) Filed: Jun. 4, 2018

(65) Prior Publication Data

US 2018/0274746 A1  Sep. 27, 2018

Related U.S. Application Data

(63) Continuation of application No. PCT/EP2016/079652, filed on Dec. 2, 2016.

(30) Foreign Application Priority Data

Dec. 3, 2015 (DE) ........................ 10 2015 121 008

(51) Int. Cl.
| | | |
|---|---|---|
| *F21S 45/10* | (2018.01) | |
| *B60Q 1/04* | (2006.01) | |
| *F21V 15/01* | (2006.01) | |

(52) U.S. Cl.
CPC ............. *F21S 45/10* (2018.01); *B60Q 1/0441* (2013.01); *B60Q 1/0491* (2013.01); *F21V 15/013* (2013.01)

(58) Field of Classification Search
CPC ..... F21S 45/10; B60Q 1/0491; B60Q 1/0441; F21V 15/013

USPC ..................................................... 296/187.09
See application file for complete search history.

(56) References Cited

U.S. PATENT DOCUMENTS

| | | | |
|---|---|---|---|
| 7,946,745 B2 | 5/2011 | Baert et al. | |
| 9,211,836 B2* | 12/2015 | Eckert | B60Q 1/0416 |
| 2008/0048422 A1 | 2/2008 | Eichhorn et al. | |
| 2016/0068192 A1* | 3/2016 | Sakai | B62D 25/08 |
| | | | 296/187.09 |

FOREIGN PATENT DOCUMENTS

| | | | |
|---|---|---|---|
| DE | 102004017631 A1 | 10/2005 | |
| DE | 102006027460 A1 | 12/2007 | |
| DE | 602005000774 T2 | 1/2008 | |
| DE | 102012005496 A1 | 11/2012 | |
| DE | 102013004287 A1 | 9/2014 | |
| EP | 1645465 A1 | 4/2006 | |
| JP | 2004203288 A * | 7/2004 | ........... B60Q 1/0491 |
| JP | 2004203288 A | 7/2004 | |

OTHER PUBLICATIONS

International Search Report dated Feb. 7, 2017 in corresponding application PCT/EP2016/079652.

* cited by examiner

*Primary Examiner* — Joseph D. Pape
*Assistant Examiner* — Dana D Ivey
(74) *Attorney, Agent, or Firm* — Muncy, Geissler, Olds & Lowe, P.C.

(57) ABSTRACT

An arrangement of a headlight on a vehicle with protection from damage for the event of a crash, wherein the headlight has a housing with which it is attached to a body of the vehicle by at least one molded attachment feature. A sheet metal element is designed such that it forms a sliding surface for the body in the event of a crash and is arranged on the housing of the headlight.

14 Claims, 3 Drawing Sheets

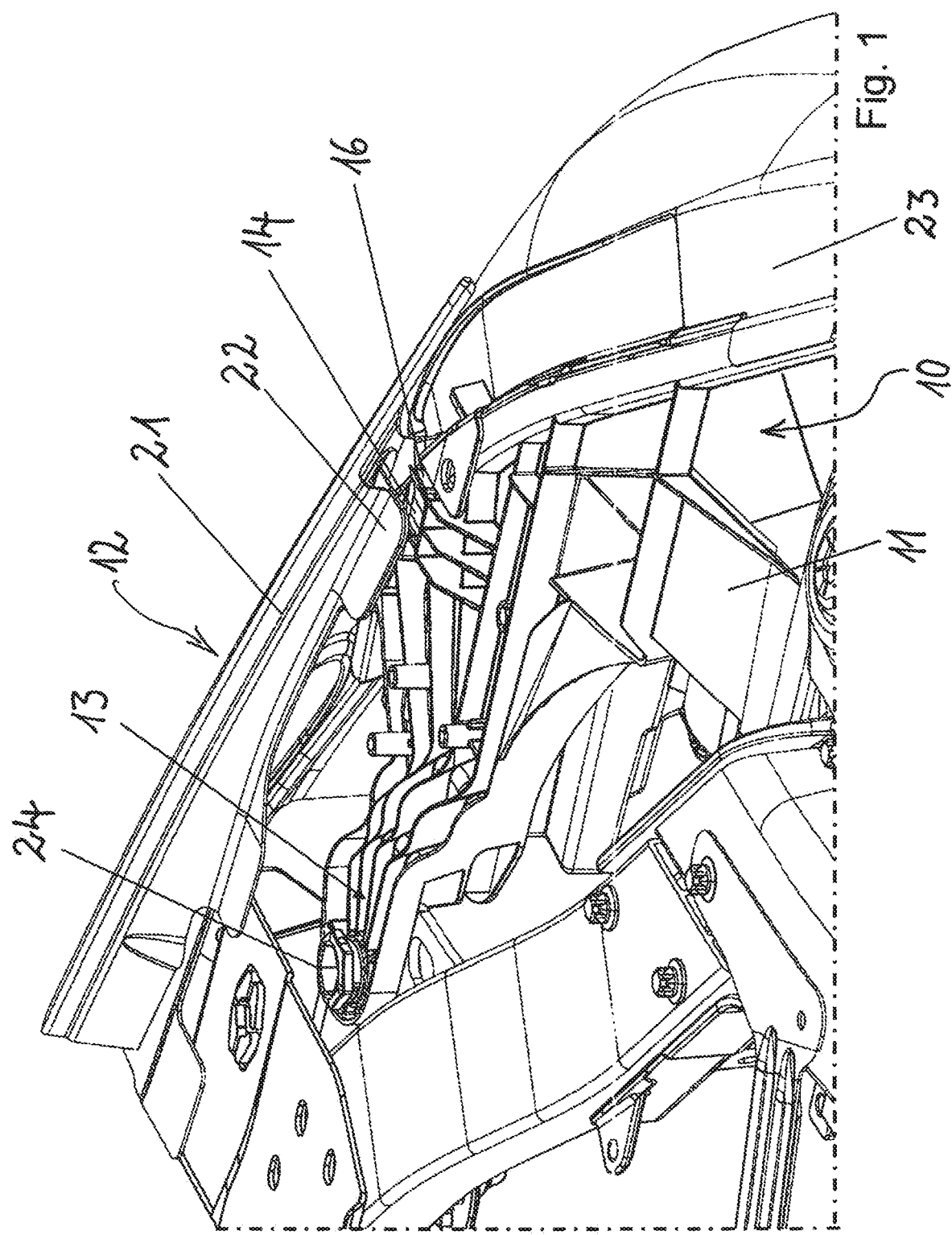

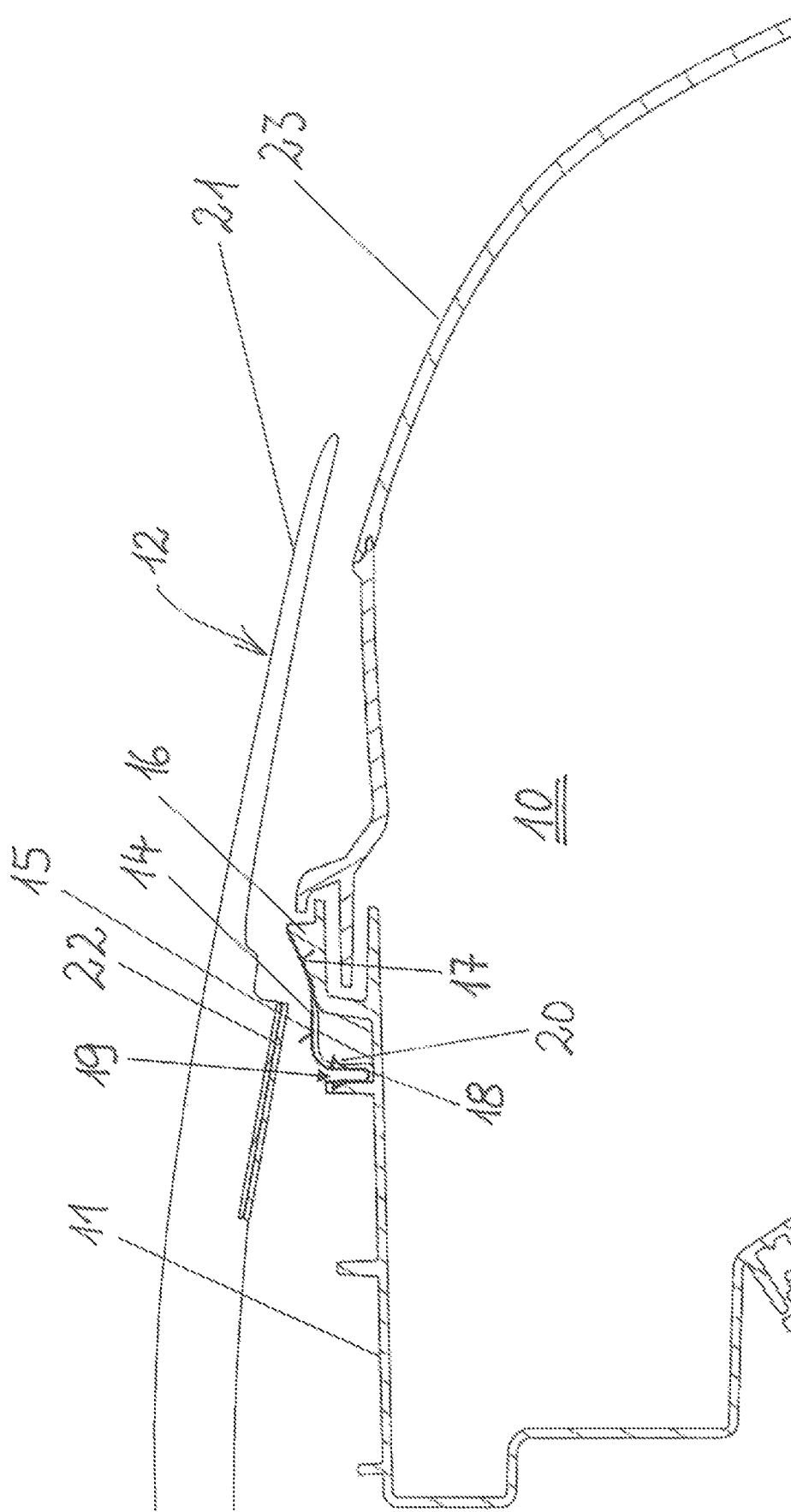

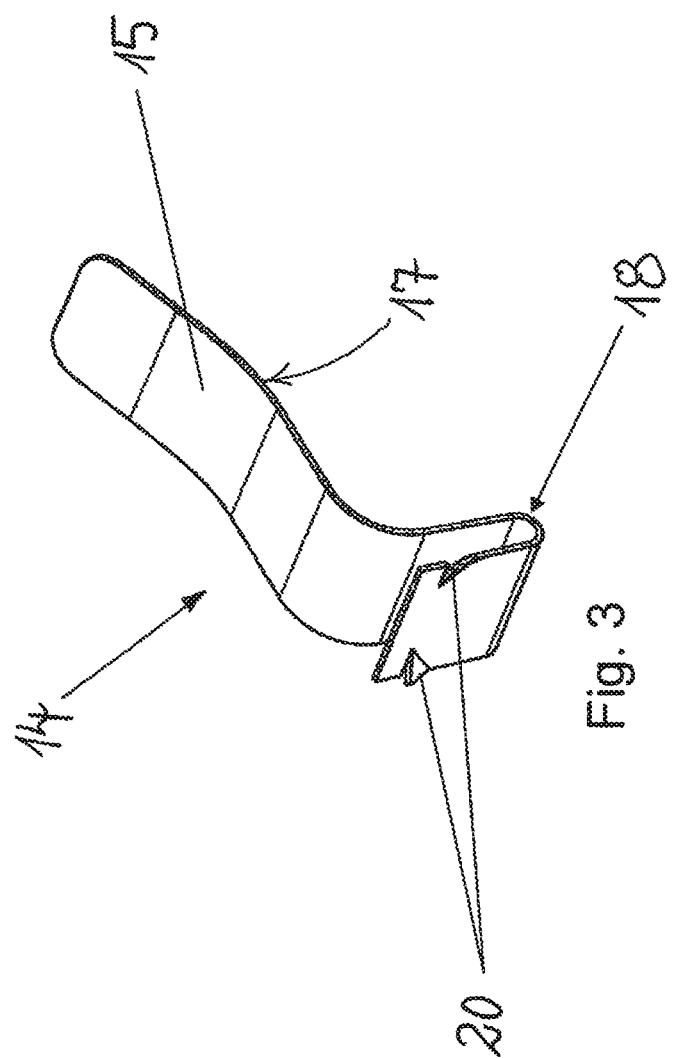

ARRANGEMENT OF A HEADLIGHT IN A VEHICLE HAVING DAMAGE PROTECTION FOR THE EVENT OF A CRASH

This nonprovisional application is a continuation of International Application No. PCT/EP2016/079652, which was filed on Dec. 2, 2016, and which claims priority to German Patent Application No. 10 2015 121 008.8, which was filed in Germany on Dec. 3, 2015, and which are both herein incorporated by reference.

BACKGROUND OF THE INVENTION

Field of the Invention

The present invention relates to an arrangement of a headlight on a vehicle with protection from damage for the event of a crash, wherein the headlight has a housing with which it is attached to a body of the vehicle by at least one molded attachment feature.

Description of the Background Art

DE 10 2013 004 287 A1 describes a generic arrangement of a headlight on a vehicle with protection from damage for the event of a crash. In order to create the damage protection, a thrust element is provided on the vehicle body and arranged in the direction of the headlight, with which the headlight is moved in a predetermined direction in the event of a crash. This achieves the result that the headlight is systematically guided past collision points in the installation environment of the headlight. In this way, the headlight can remain undamaged, even after a crash. Only the molded attachment feature must be replaced by an appropriate repair set, if applicable.

Depending on the crash event taking place, it must disadvantageously be observed that the thrust element is sheared off, for example by the fender as a component adjacent to the headlight. Shearing-off of the thrust element is accomplished by sharp-edged sheet metal parts, in particular. For example, a mounting flange, against which the thrust element is moved in the event of a force acting on the headlight, is typically present on the fender. The mounting flange may be sufficiently sharp-edged that the thrust element is sheared off of the housing of the headlight. In consequence of the absent thrust element, damage to the headlight cannot be prevented, with the result that the headlight is no longer usable, even with a repair set. Particularly in consultation with insurers, however, the requirement usually emerges that headlights should still be usable in the aftermath of relatively minor crash events, especially within the framework of simple and minimal-cost replacement of molded attachment features with appropriate repair sets. In special circumstances, it has proven to be the case that the mounting flange of the fender, specifically, shears off the thrust element, and damage occurs to the plastic lens of the headlight, which should be avoided.

SUMMARY OF THE INVENTION

It is therefore an object of the invention to provide an arrangement of a headlight on a vehicle with improved protection from damage. In particular, the aim is to avoid damage to a headlight by parts of the vehicle body in the event of a crash. The improved damage protection should be implemented as simply as possible here. In particular, an existing design of the headlight with its housing and its plastic lens should be preserved.

In an exemplary embodiment, a sheet metal element, which is designed such that it forms a sliding surface for the vehicle body in the event of a crash, is arranged on the housing of the headlight.

Thus, the invention provides a reinforcement of at least one region on the housing of the headlight that comes into contact with the body of the vehicle in the event of a crash. The purpose of the reinforcement is to keep damage from occurring to the housing of the headlight, in particular to the plastic lens, from the contact with the vehicle body. The concept of the invention is restricted here to the application of a simple sheet metal element that offers a sliding surface on or at which parts of the vehicle body, for example the fender, can slide such that no catching—which causes breakage, shearing, or other damage to the headlight—occurs during a movement of the headlight relative to its installation environment.

A molded thrust feature, on which rests a bearing surface of the sheet metal element located opposite the sliding surface, can be formed on the headlight. The molded thrust feature constitutes a ramp-like molded feature on the outside of the housing, on which the surrounding parts of the headlight can slide along in the event of a crash, in particular in order to avoid interlocking engagement of surrounding rims, edges, or the like. In particular, the molded thrust feature serves to avoid contact of the surrounding parts with the plastic lens. If the sheet metal element is applied in accordance with the invention to the ramp surface of the molded thrust feature, the top of the sheet metal element forms the sliding surface, while a bearing surface of the sheet metal element rests on the molded thrust feature. Forces that arise are introduced into the molded thrust feature in essentially the same manner here. Sharp-edged components, in particular a mounting flange on the adjacent fender, are no longer able to cut into the sheet metal element as they could into the plastic material of the molded thrust feature, so shearing of the molded thrust feature likewise no longer takes place.

The sheet metal element can have a spring steel material, resulting in especially high strength and thus strong protection against damage to the molded thrust feature. In this case, it may be sufficient for the sheet metal element to have a thickness of only 0.5 mm, for example.

The sheet metal element can have a clip section that is inserted into a receiving recess on the housing of the headlight. The clip section thus creates the possibility of fastening the sheet metal element to the housing of the headlight without additional fasteners, in particular in that the clip section is snapped into the receiving recess of the housing. In order to further improve a captive arrangement of the clip section in the receiving recess, the clip section has locking notches by means of which the clip section digs into the receiving recess of the housing.

For example, the body of the vehicle includes a fender, wherein the fender is located adjacent to the sheet metal element and covers it. The fender has, for example, a mounting flange that is located adjacent to the sheet metal element. If a crash event occurs in which the headlight is displaced toward the fender through the action of an external force, the mounting flange slides over a sliding surface of the sheet metal element, wherein the sliding surface faces in the direction of the mounting flange. As a result of the strength of the sheet metal element, a molded thrust feature located below the sheet metal element experiences no plastic deformation. Consequently, damage to the headlight that is displaced toward the fender can be efficaciously prevented, at least damage resulting from the fender and, in particular, from the mounting flange.

The invention is additionally directed toward a headlight for a vehicle with protection from damage for the event of a crash, having a housing with at least one molded attachment feature by means of which the headlight can be attached to the body of the vehicle. According to the invention, a sheet metal element, which is designed such that it forms a sliding surface for the body in the event of a crash, is arranged on the housing of the headlight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a perspective view of an arrangement of a headlight on a vehicle with a sheet metal element according to an exemplary embodiment of the invention on the headlight;

FIG. 2 is a cross-sectional view through a headlight in an arrangement on a vehicle; and FIG. 3 is a perspective view of the sheet metal element according to an embodiment of the invention.

DETAILED DESCRIPTION

FIG. 1 shows the arrangement of a headlight 10 with a housing 11 on a vehicle, wherein the vehicle in FIG. 1 is represented by a part of the body 12. The part of the body 12 constitutes a fender 21, which is arranged next to the headlight 10. A molded attachment feature 13 serves to attach the headlight 10 to the body 12. The headlight 10 is attached with a fastener 24 by means of the molded attachment feature 13 to a part of the body 12. On the front, the headlight 10 terminates with a plastic lens 23, which extends in front of the housing 11 in the direction of travel, and, together with the housing, forms an enveloping body of the headlight.

Located on the fender 21 is a mounting flange 22, which is adjacent to a molded thrust feature 16 of the housing 11 of the headlight 10. According to the invention, a sheet metal element 14 is arranged on the molded thrust feature 16. If the headlight 10 is pressed into the vehicle structure in the event of a crash, the mounting flange 22 comes into contact with the sheet metal element 14, and can slide thereon. When this occurs, the sheet metal element 14 experiences no significant damage, and since the sheet metal element 14 protects the molded thrust feature 16 present beneath the sheet metal element 14, this molded feature is not destroyed in the damage event even when relatively high forces arise on the molded thrust feature 16. Consequently, the reinforcement of the molded thrust feature 16 with the sheet metal element 14 achieves the result that the mounting flange 22 does not damage the plastic lens 23 of the headlight 10.

The molded attachment feature 13 shown and, in particular, the fastener 24, may break in a damage event, wherein these components can be replaced by an appropriate repair set. If the headlight 10 and, in particular, the plastic lens 23 remain undamaged, they may continue to be used even after a crash event.

FIG. 2 shows, in a cross-sectional view, the headlight 10 with the housing 11 and the plastic lens 23 on the front. Above the headlight 10, the cross-sectional view shows the fender 21 as part of the body 12 of a vehicle, and the mounting flange 22 is shown on the fender 21 in the sectional view.

The view shows the sheet metal element 14 in an arrangement on a molded thrust feature 16 as part of the housing 11 of the headlight 10. On its top, the sheet metal element 14 has a sliding surface 15, over which the mounting flange 22 can slide in the event of a crash so that the molded thrust feature 16 remains undamaged. Here, a bearing surface 17 of the sheet metal element 14 rests on the molded thrust feature 16, wherein the bearing surface 17 constitutes the surface located opposite the sliding surface 15.

Serving the purpose of self-retaining arrangement of the sheet metal element 14 on the housing 11 is a receiving recess 19 of the housing 11, into which is snapped a clip section 18 of the sheet metal element 14. To prevent the clip section 18 from coming out of the receiving recess 19, the sheet metal element 14 has, in the region of the clip section 18, locking notches 20 that can dig partially into the plastic of the housing 11 in the interior of the receiving recess 19.

FIG. 3 shows the sheet metal element 14 in a perspective view. As shown in FIG. 3, the sheet metal element 14 is designed in the manner of a tongue and has a sliding surface 15 on the top side and a bearing surface 17 on the bottom side. In addition, the sheet metal element 14 forms a clip section 18 with a U-shaped design. Shown by way of example on one leg of the U of the clip section 18 are locking notches 20, which are notched out of the plane of the sheet metal using a simple stamping and bending process, and are correspondingly sharp-edged. The locking notches 20 can dig into the inner wall of the receiving recess 19 of the housing 11, so that locking accommodation of the sheet metal element 14 on the housing 11 is achieved through a slight plastic forming of the inside of the receiving recess 19.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement of a headlight on a vehicle with protection from damage in an event of a crash, the arrangement comprising:
   a housing with which the headlight is attached to a body of the vehicle by at least one molded attachment; and
   a sheet metal element arranged on the housing of the headlight, the sheet metal element having a sliding surface that faces a portion of the body and is spaced apart from the portion of the body, and, in the event of a crash, the portion of the body comes into direct contact with the sliding surface of the sheet metal element and is slidable along the sliding surface.

2. The arrangement according to claim 1, further comprising a molded thrust feature formed on the headlight, wherein a bearing surface of the sheet metal element, located opposite the sliding surface, rests on the molded thrust feature.

3. The arrangement according to claim 1, wherein the sheet metal element is formed of a spring steel material.

4. The arrangement according to claim 1, wherein the sheet metal element has a clip section that is inserted into a receiving recess on the housing of the headlight.

5. The arrangement according to claim 4, wherein the clip section has locking notches via which the clip section is fixedly attached into the receiving recess of the housing.

6. The arrangement according to claim 1, wherein the body of the vehicle includes a fender that is located adjacent to the sheet metal element and covers the sheet metal element.

7. The arrangement according to claim 6, wherein the fender has a mounting flange that is located adjacent to the sheet metal element, and wherein the mounting flange is the portion of the body that is spaced apart from the sliding surface of the sheet metal element and that comes into direct contact with the sliding surface of the sheet metal element in the event of the crash.

8. A headlight for a vehicle with protection from damage in an event of a crash, the headlight comprising:
    a housing with at least one molded attachment via which the headlight is adapted to be attached to a body of the vehicle; and
    a sheet metal element arranged on the housing of the headlight, the sheet metal element having a sliding surface that faces a portion of the body and is spaced apart from the portion of the body, and, in the event of a crash, the portion of the body comes into direct contact with the sliding surface of the sheet metal element and is slidable along the sliding surface.

9. The arrangement according to claim 1, wherein the sheet metal element is non-planar, such that the sheet metal element extends along more than one plane.

10. The arrangement according to claim 2, wherein the molded thrust feature has an inclined surface, and wherein a portion of the bearing surface of the sheet metal element rests upon the inclined surface.

11. The arrangement according to claim 5, wherein the clip section is U-shaped, and wherein the locking notches are pointed, notched portions of the clip section that are bent outwardly to engage with an inner wall of the receiving recess of the housing.

12. The headlight according to claim 8, wherein the sheet metal element is non-planar, such that the sheet metal element extends along more than one plane.

13. The headlight according to claim 8, further comprising a molded thrust feature formed on the headlight, wherein a bearing surface of the sheet metal element, located opposite the sliding surface, rests on the molded thrust feature, wherein the molded thrust feature has an inclined surface, and wherein a portion of the bearing surface of the sheet metal element rests upon the inclined surface.

14. The headlight according to claim 8, wherein the sheet metal element has a clip section that is inserted into a receiving recess on the housing of the headlight, wherein the clip section has locking notches via which the clip section is fixedly attached into the receiving recess of the housing, wherein the clip section is U-shaped, and wherein the locking notches are pointed, notched portions of the clip section that are bent outwardly to engage with an inner wall of the receiving recess of the housing.

\* \* \* \* \*